United States Patent [19]

Kannegundla et al.

[11] Patent Number: 5,264,945
[45] Date of Patent: Nov. 23, 1993

[54] CONTACT ARRAY SCANNERS WITH CIRCULATING MEMORY

[75] Inventors: Ram Kannegundla; Bruce C. Burkey, both of Rochester, N.Y.

[73] Assignee: Eastman Kodak Company, Rochester, N.Y.

[21] Appl. No.: 777,860

[22] Filed: Oct. 16, 1991

[51] Int. Cl.$^5$ .............................................. H04N 3/14
[52] U.S. Cl. ............................... 358/444; 358/482; 358/213.22
[58] Field of Search ........................... 358/482–483, 358/213.22, 213.23, 213.27, 213.29, 444, 404

[56] References Cited

U.S. PATENT DOCUMENTS

| | | | |
|---|---|---|---|
| 3,980,817 | 9/1976 | Penn | 178/6 |
| 4,044,384 | 8/1977 | Inokuchi | 358/293 |
| 4,147,928 | 4/1979 | Crean et al. | 235/454 |
| 4,149,090 | 4/1979 | Agulnek | 250/566 |
| 4,280,141 | 7/1981 | McCann et al. | 358/213 |
| 4,439,790 | 3/1984 | Yoshida | 358/256 |
| 4,449,151 | 5/1984 | Yokota et al. | 358/293 |
| 4,459,619 | 7/1984 | Yoshida | 358/293 |
| 4,465,939 | 8/1984 | Tamura | 250/578 |
| 4,539,596 | 9/1985 | Elabd | 358/213 |
| 4,543,610 | 9/1985 | Ozawa et al. | 358/213.22 |
| 4,598,321 | 7/1986 | Elabd et al. | 358/213 |
| 4,608,608 | 8/1986 | Nishizawa et al. | 358/213.22 |
| 4,647,955 | 3/1987 | Portmann et al. | 357/24 |
| 4,647,977 | 3/1987 | Tower | 358/2 |
| 4,712,137 | 12/1987 | Kadekodi et al. | 358/213.29 |
| 4,746,972 | 5/1988 | Takanashi et al. | 358/43 |
| 4,754,338 | 6/1988 | Hideshima | 358/293 |
| 4,839,734 | 6/1989 | Takemura | 358/213.22 |
| 4,878,121 | 10/1989 | Hynecek | 358/213.22 |
| 4,928,158 | 5/1990 | Kimata | 357/24 |
| 5,187,584 | 2/1993 | Nishiki et al. | 358/213.22 |

Primary Examiner—Stephen Brinich
Attorney, Agent, or Firm—Raymond L. Owens

[57] ABSTRACT

A plurality of linear image sensors of a contact array scanner are read out at relatively low sensor pixel rates using only a limited number of expensive digital components. For a contact array scanner having sensors with both forward and reverse readouts, outputs are selected and read together in parallel from successive pairs of forward sensor readouts. Individual outputs from each of the forward readout pairs are sequentially sampled and held and the samples from each of the forward readout pairs are digitized. Outputs are also selected and read together in parallel from successive pairs of reverse sensor readouts. Individual outputs from each of the reverse readout pairs are sequentially sampled and held and the samples from each of the reverse readout pairs are digitized. Digitized samples from successive ones of the forward readout pairs are written into alternate ones of two pairs of first in first out digital memories and digitized samples from the reverse readout pairs are written into alternate ones of two pairs of last in first out memories. Finally, the contents of each pair of first in first out memories and the contents of each pair of last in first out memories are read out while the next pairs of digitized samples are being written into the other sets of first in first out and last in first out digital memories.

32 Claims, 3 Drawing Sheets

CONTACT ARRAY SCANNERS WITH CIRCULATING MEMORY

FIELD OF THE INVENTION

This invention relates generally to contact array scanners using linear image sensors and, more particularly, to scanners in which multiple sensors are used to read a complete line of the original image at a time and to methods for their operation.

BACKGROUND OF THE INVENTION

CCD (charge coupled device) image sensors are frequently used for reading the original image of a document or succession of documents in copiers and facsimile apparatus. Such image sensors are typically single dimensional and are capable of electrical scanning in a principal (e.g., horizontal) direction to obtain density information of an image in the form of time sequential electrical signals. Scanning in an auxiliary (e.g., vertical) direction is achieved by moving the original image at right angles with respect to the linear sensor array. As a result, a complete pattern of the original two-dimensional image is created in the form of time sequential signals which are capable of being transmitted to another location, stored in memory, or both.

Each photosensitive site on a CCD image sensor is called a pixel (for picture element). The resolution of a sensor increases with the number of pixels it contains. For good quality document reading purposes, an acceptable resolution is of the order of 300 pixels per inch. Single sensor systems capable of reproducing the long horizontal lines contained in large documents are technically difficult to realize and would, even if technically feasible, be quite expensive. For this reason, multiple sensor systems have been devised in which the length of the sensor arrangement is at least equal to the length of an individual line of the image being read and in which portions of the line being read is overlapped slightly by adjacent sensors.

As the width of a document increases, the resulting increase in line length requires more time to be spent in reading each line if the pixel readout rate (the horizontal clock frequency) for each sensor remains the same and each sensor is read out in sequence. For a system using a total of N sensors, the effective line readout rate would be reduced by a factor of N. Copying a complete document in this manner can be a very slow affair because of the resulting low line readout rate. On the other hand, if the pixel readout rate for each sensor is increased too much, problems of charge transfer inefficiency (usually referred to in the art as CTI) will be encountered. To maintain the line readout rate of a single sensor system, the pixel readout rate for each sensor would have to be increased by a factor of N. For a value of N equal to 6, the individual sensor readout rate would need to be 6 times normal and CTI problems would almost certainly be encountered.

One approach which may be taken to increase the line readout rate of a contact array scanner is to provide each sensor with double ended outputs without changing the pixel readout rate. A 6 sensor arrangement would, in other words, have only the standard pixel readout rate of a single sensor system but would have 12 outputs. With this approach, data from each sensor output would be read into a large digital memory known as a frame store and computer techniques would be used to reconstruct the image being scanned. The frame store could be for either one or two document pages, depending upon the amount of processing needed. Computers and frame stores operating at the speeds at which video sensors operate tend to be quite expensive, so this approach tends not to be of universal applicability by itself even though it may avoid CTI problems.

An alternative approach for increasing the line readout rate of a multiple sensor contact array scanner is simply to read out the contents of all sensors at once, leaving the pixel readout rate for each sensor as it was. This approach, too, tends to be quite expensive as it requires use of both a large number of analog to digital converters and a large number of digital memories. A system with 6 double ended sensors would, for example, require 12 analog to digital converters and 24 digital memories. There is an important need, therefore, to be able to speed up line readout rates in multiple sensor contact array scanners without introducing charge transfer inefficiency problems in the sensors but also without the need to use either expensive frame stores or large numbers of expensive analog to digital converters and digital memories.

SUMMARY OF THE INVENTION

The present invention permits the contents from a plurality of linear image sensors in a contact array scanner to be read out without increasing the pixel readout rate per sensor to the point of charge transfer inefficiency (CTI), but without requiring an undue number of digital memories or analog to digital converters.

In its broader aspects, the invention comprises both a method and a system for reading the contents from a plurality of N linear image sensors. In both, parallel outputs from successive groups of n sensors at a time are selected and read, where n is an integer greater than one. Individual outputs from each of the groups are sampled and held in sequence. The samples of each of the groups are digitized in sequence and then the digitized samples of successive ones of the groups are written into alternate ones two sets of n digital memories. Finally, the contents are read out of each set of digital memories while the next group of digitized samples is being written into the other set of digital memories. Somewhat more specifically, from both method and system aspects of the invention, the number N of linear image sensors is an integer into which n is divisible by an integer greater than one.

In other more specific aspects of the invention, the samples of each of the groups are digitized by a common analog to digital converter, pixels are read from sensor outputs at N/n times the ratio of the number of pixels per sensor output to total line time, and the rate at which individual samples are digitized is equal to n times the rate at which pixels are read from sensor outputs. In still others, the rate of writing digitized samples into the memories is equal to the rate at which pixels are read from sensor outputs and the rate of reading the contents out of the memories is equal to the rate at which pixels are read from sensor outputs times the number of memories.

In application, the invention permits individual sensors to be read out at a pixel rate N/n times the ratio of the number of pixels per sensor output to total line time. At the same time, it requires only a single analog to digital converter and only 2n digital memories for single ended sensors. For a value of n equal to 2 in such systems, only 4 digital memories are needed. If the pixel readout rate afforded by a value of n equal to 2 still encounters CTI problems, a larger value of n may be employed at the cost of only a small increase in the number of digital memories.

The invention, in many of its aspects, applies equally well when reading out the contents from a plurality of N linear image sensors when each of the sensors is provided with both a forward readout and a reverse readout. In a broad sense, the invention may be viewed as applying separately with respect to the forward readouts and with respect to the reverse readouts.

More specific aspects of the invention may be applied to both forward and reverse readouts at once. In this sense, parallel outputs from the forward readouts are selected and read in successive groups of n sensors at a time, where n once again is an integer greater than one. Individual outputs from each of the forward readout groups are sampled and held in sequence. The samples from each forward readout group are digitized in sequence. Parallel outputs from the reverse readouts are selected and read in successive groups of n sensors at a time.

Individual outputs from each of the reverse readout groups are also sampled and held in sequence. The samples from each reverse readout group are digitized in sequence. The digitized samples of successive ones of the forward readout groups are written into alternate ones of two sets of n first in first out digital memories. The digitized samples of successive ones of the reverse readout groups are written into alternate ones of two sets of n last in first out digital memories. Finally, the contents of each set of first in first out digital memories and the contents of each set of last in first out digital memories are read out while the next groups of digitized samples are being written into the other sets of first in first out and last in first out digital memories. Somewhat more specifically, the number N of linear image sensors is an integer into which n is divisible by an integer greater than one.

In other more specific aspects of the invention as applied to sensors with both forward and reverse readouts, the samples of each of the forward readout groups are digitized by a first common analog to digital converter and the samples of each of the reverse readout groups are digitized by a second common analog to digital converter. Pixels are read from sensor outputs at N/n times the ratio of the number of pixels per sensor output to total line time. The rate at which individual samples are digitized is equal to n times the rate at which pixels are read from sensor outputs. The rate of writing digitized samples into memories is equal to the rate at which pixels are read from sensor outputs. Finally, the rate of reading the contents out of the memories is equal to the rate at which pixels are read from sensor outputs times the number of memories.

As previously noted, the invention permits individual sensors to be read out at a pixel rate N/n times the ratio of the number of pixels per sensor output to total line time. With double output sensors, the number of pixels per output is half that of identical single output sensors, which in itself enables the pixel rate to be cut in half. At the same time, the invention requires only two analog to digital converters, only 2n first in first out digital and 2n last in first out digital memories for double output sensors. Thus, For a value of n equal to 2 in such systems, only 8 digital memories are needed in all. Once again, if the pixel readout rate afforded by a value of n equal to 2 still encounters CTI problems, a larger value of n may be employed at the cost of only a relatively small increase in the number of digital memories.

The invention will be better understood in its various aspects from the following detailed description of a specific embodiment, taken in the light of the accompanying drawing and the appended claims.

DETAILED DESCRIPTION

Figure 1A:
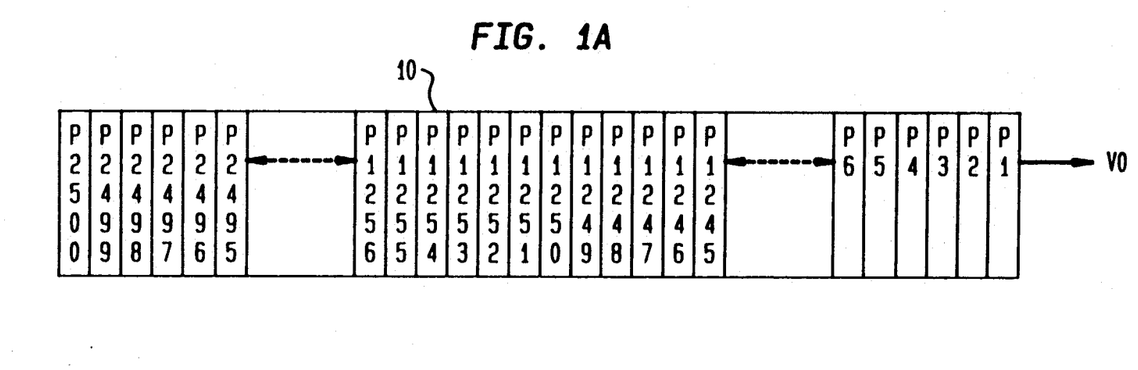
FIG. 1A represents a linear sensor with a single readout as output.

In FIG. 1A, a single ended image sensor 10 contains a total of 2500 pixels, arranged from a first pixel P1 at the right and continuing on through a final pixel P2500 at the left. A single output V0 is placed next to pixel P1 at the right. All 2500 pixels are read out of image sensor 10 through output V0 in numerical sequence. As a result, the order in which pixels appear at output V0 is the same as the order of the pixels in the segment of the line of the original image read by sensor 10.

Figure 1B:
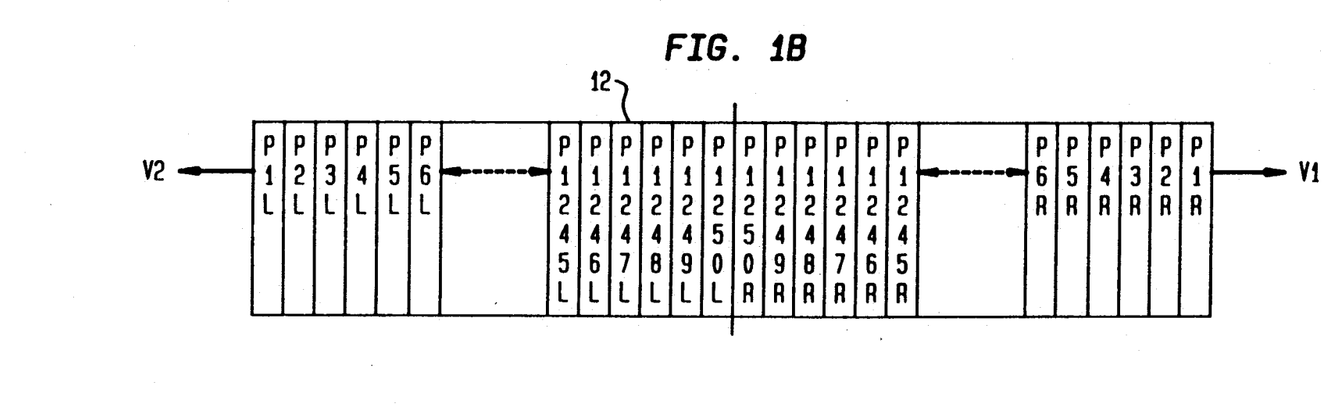
FIG. 1B represents a linear sensor with both forward and reverse readouts.

In FIG. 1B, a double ended image sensor 12 contains the same total of 2500 pixels as sensor 10, but with a different pixel arrangement. Sensor 12 has a first output V1 at the right and a second output V2 at the left. Sensor 12 is essentially split at the middle, having 1250 pixels on its right hand side and another 1250 pixels on its left hand side. As shown in FIG. 1B, the right hand set of pixels is arranged from a first pixel P1R at the right and continues on through a final pixel P1250R in the center of sensor 12. The left hand set of pixels is arranged from a first pixel P1L at the left and continues on through a final pixel P1250L in the center of sensor 12. The right hand set of pixels is read out of image sensor 12 in numerical sequence through output V1, while the left hand set of pixels is read out of image sensor 12 in numerical sequence through output V2. In the time domain, pixel P1R and pixel P1L are read out together, as are pixels P2R and P2L, and so on through pixels P1250R and P1250L. Sensor 12 thus differs from sensor 10 in that, while the order in which pixels appear at output V1 is the same as their order in the line of the original image being read, the order in which pixels appear at output V2 is just the reverse.

Although the invention is equally applicable to either single or double ended sensor arrangements, the remainder of this description will be devoted primarily to a double ended sensor arrangement, with commentary added where appropriate about how a single ended sensor arrangement would differ.

Figure 2:
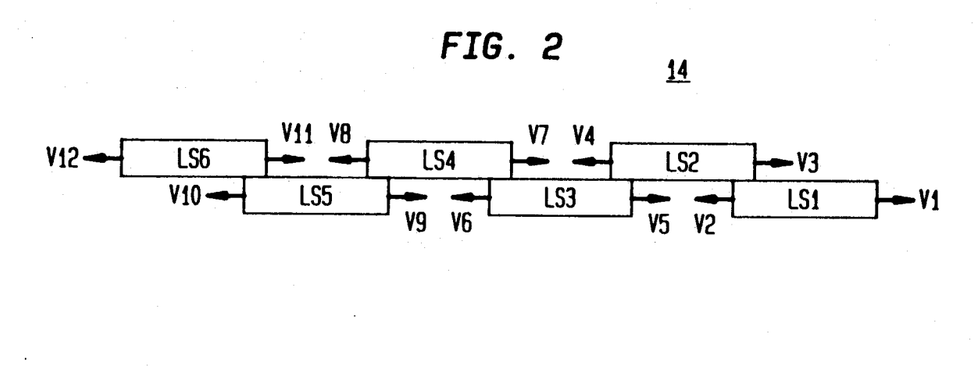
FIG. 2 is a block diagram of an array of six linear sensors arranged to be able to read a longer image line than could be read by one sensor alone.

FIG. 2 illustrates a contact array scanner 14 composed of 6 double ended linear sensors LS1 through LS6. The sensors are arranged horizontally, with even and odd sensors in contact with one another but displaced from one another vertically and with slight overlap between adjacent sensors in the manner shown.

Such an arrangement is taught, for example, in U.S. Pat. No. 4,754,338, which issued Jun. 28, 1988, to T. Hideshima and is incorporated herein by reference. The odd numbered sensors thus encounter the image line being scanned first, with the even numbered sensors coming slightly later. As shown, sensor LS1 has outputs V1 and V2, sensor LS2 has outputs V3 and V4, sensor LS3 has outputs V5 and V6, sensor LS4 has outputs V7 and V8, sensor LS5 has outputs V9 and V10, and sensor LS6 has outputs V11 and V12. Of these outputs, all odd numbered outputs correspond to output V1 of sensor 12 in FIG. 1B, while all even numbered outputs correspond to output V2 of sensor 12 in FIG. 1B. Thus, outputs V1, V3, V5, V7, V9, and V11 of contact array scanner 14 all bring out the pixels of the image in the correct order, while outputs V2, V4, V6, V8, V10, and V12 of contact array scanner 14 all bring out the pixels of the image in inverted order.

Within contact array scanner 14, each sensor output is typically provided with its own on-chip sample and hold circuit. If not, external sample and hold circuits may be provided in the manner illustrated in FIG. 3.

Figure 3:
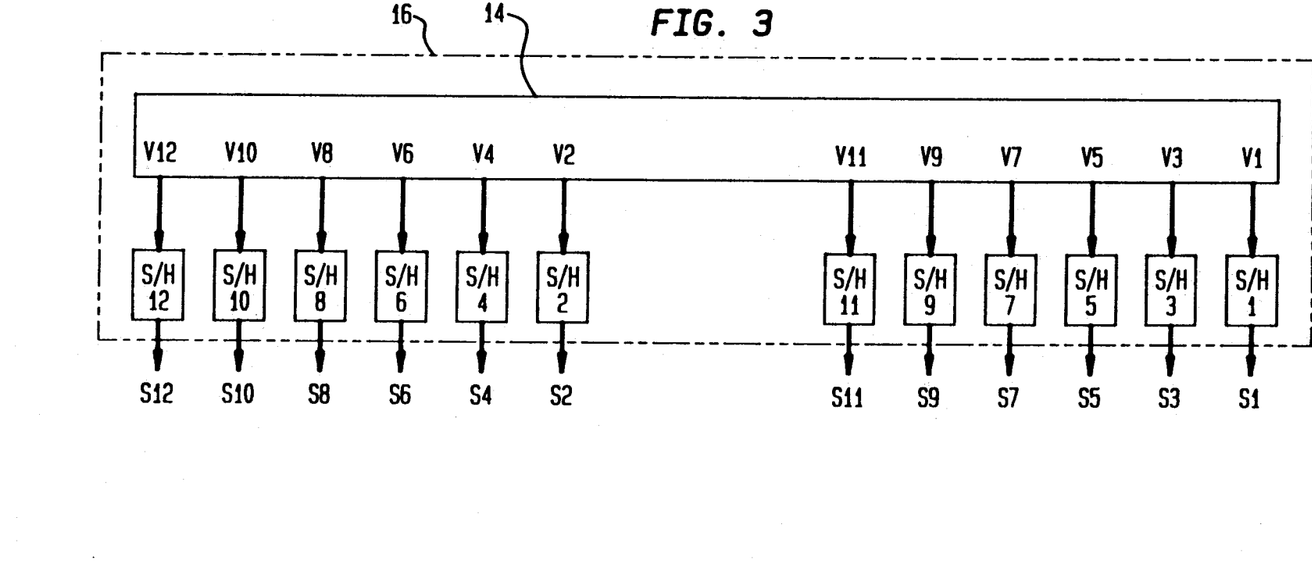
FIG. 3 shows the sensor array of FIG. 2 with individual sample and hold circuits connected to each sensor output.

In FIG. 3, a scanner package 16 comprises scanner 14, and a dozen sample and hold circuits S/H1 through S/H12. As shown, odd numbered sample and hold circuits S/H1, S/H3, S/H5, S/H7, S/H9, and S/H11 are connected to odd numbered scanner outputs V1, V3, V5, V7, V9, and V11, respectively, and have their own individual outputs S1, S3, S5, S7, S9, and S11. Similarly, sample and hold circuits S/H2, S/H4, S/H6, S/H8, S/H10, and S/H12 are connected to even numbered scanner outputs V2, V4, V6, V8, V10, and V12, respectively, and have their own individual outputs S2, S4, S6, S8, S10, and S12.

In the past, it would have been necessary to read out the contents from a group of sensors LS1 through LS6 like those of scanner 14 in FIG. 2 either simultaneously or sequentially. While reading them out sequentially would create one set of problems, reading them out simultaneously would, unfortunately, only create another. A basic difficulty involves the time needed to reproduce a single line of the image being scanned. If this line time (i.e., the time needed to reproduce a single line) is to approach the normal readout rate used for small images, when only a single sensor may be needed to reproduce a full horizontal line of the image, reading out all sensors in sequence would require a very high individual sensor readout rate. Such a high readout rate would very likely introduce problems of charge transfer inefficiency (CTI) and make such operation essentially impossible. Slowing down the individual sensor readout rate sufficiently to avoid CTI problems would, on the other hand, result in an undesirably slow line rate. A previously known alternative was to read out the contents from all sensors simultaneously.

One technique for reading out the contents from all sensors simultaneously requires use of large digital memories known as frame stores and rely upon digital computer techniques to reconstruct the image being scanned. Sensor readout rate can usually be kept low enough in this manner to avoid CTI problems. A severe limitation is the cost of such digital accessories as frame stores and computers is high, which tends to limit the technique's applicability.

Another known technique requires, for a scanner 16 of the type shown in FIG. 3, use of as many as a dozen analog to digital converters and as many as two dozen digital line memories. It requires that the output of each sample and hold circuit be supplied to a separate analog to digital converter and requires use of a dozen first in first out digital memories and another dozen last in first out digital memories. The sample and hold circuits handling odd numbered sensor outputs would, in such an arrangement, first supply six first in first out digital memories and then supply the other six first in first out digital memories while the contents are being read out of the first six. Similarly, the sample and hold circuits handling even numbered sensor outputs would first supply six last in first out digital memories and then supply the other six last in first out digital memories while the contents were being read out of the first six. Such a large number of digital components also adds to the cost of the arrangement and, for that reason, tends to be a factor limiting the technique's applicability.

In general, the horizontal clock frequency (the pixel rate) P of any sensor in a multiple sensor contact array scanner of the type being described is given by the equation $$P = [p/(T \times o)] \times (N/n) \quad (1)$$

where p is the number of pixels per sensor, T is the time allowed for reading one line of the image being scanned (i.e., the line time), and o is the number of outputs per sensor. N, as previously defined, is the total number of sensors in the system and D, as previously defined, is the number of sensors clocked out at a time. For a 6 sensor system (N equal to 6), each with a single output (o equal to 1) having 2500 (p equal to 2500) pixels per sensor with a scanning time limit of 625 microseconds (T equal to 625 microseconds), emptying one sensor at a time (n equal to 1) would require a horizontal clock frequency P of $$P = 6 \times 2500/0.000625 = 24 \; MHz \quad (2)$$

Such horizontal clock frequency (pixel rate) would inevitably introduce severe CTI problems.

If all sensors are clocked out at the same rate simultaneously in the time T (i.e., n equal to 6), the horizontal clock frequency of the sensors would be $$P = p/(T \times o) \quad (3)$$

For the above example, P would then be only 4 megahertz, a dramatic reduction which would avoid any CTI problems. The cost, absent the present invention, would be a significant increase in the amount of expensive hardware required, particularly in the form of semiconductor digital memory chips.

Figure 4:
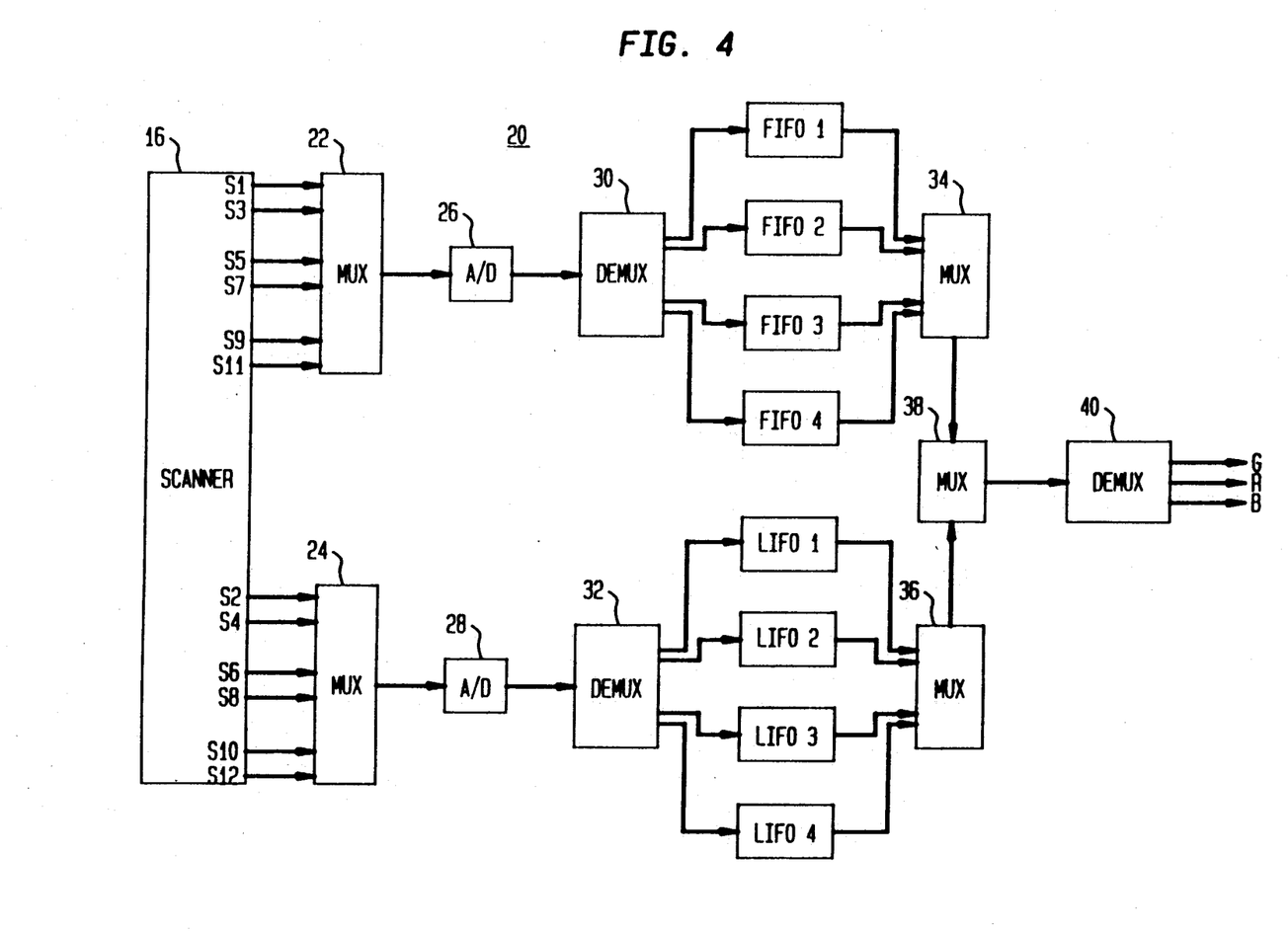
FIG. 4 is a block diagram of a complete system according to the invention in which sensors have both forward and reverse readouts.

In FIG. 4, a complete system 20 according to the invention comprises the scanner package 16 of FIG. 3, which includes not only contact array scanner 14 of FIG. 2 but also sample and hold circuits for each of the double ended sensor outputs. In addition, system 20 comprises a first pair of multiplexers (MUX) 22 and 24, a pair of analog to digital converters (A/D) 26 and 28, a pair of demultiplexers (DEMUX) 30 and 32, four first in first out digital memories FIFO1 through FIFO4, four last in first out digital memories LIFO1 through LIFO4, a second pair of multiplexers (MUX) 34 and 36, a final multiplexer (MUX) 38, and a final demultiplexer (DEMUX) 40. Within system 20, multiplexer 22, analog to digital converter 26, demultiplexer 30, first in first out digital memories FIFO1 through FIFO4, and multiplexer 34 are driven by odd numbered scanner outputs S1, S3, S5, S7, S9, and S11. At the same time, multiplexer 24, analog to digital converter 28, demultiplexer 32, last in first out digital memories LIF01 through LIF04, and multiplexer 36 are driven by even numbered scanner outputs S2, S4, S6, S8, S10, and S12.

More specifically in system 20, odd numbered scanner outputs S1, S3, S5, S7, S9, and S11 of scanner 16 are all connected in sequential pairs to inputs of multiplexer 22. Thus, outputs S1 and S3 are connected to inputs of multiplexer 22 as a first pair, outputs S5 and S7 are connected at the same time to inputs of multiplexer 22 as a second pair, and so on. Multiplexer 22 has a single output which is connected to supply a byte at a time to the input of analog to digital converter 26. Analog to digital converter 26 has a single output which is connected to supply the input of demultiplexer 30. Demultiplexer 30 has two pairs of outputs, the members of one of which are connected to supply respective bytes to the inputs of memories FIF01 and FIF02. The members of the other pair of outputs of demultiplexer 30 are connected to supply respective bytes to the inputs of memories FIF03 and FIF04. Memories FIF01 and FIF02 have outputs which are connected, as a first pair, to supply bytes to respective inputs of multiplexer 34. Memories FIF03 and FIF04 have outputs which are connected, as a second pair, to supply bytes to respective inputs of multiplexer 34.

In a similar manner, even numbered scanner outputs S2, S4, S6, S8, S10, and S12 are all connected in sequential pairs to inputs of multiplexer 24. Outputs S2 and S4 are connected at the same time as a first pair to inputs of multiplexer 24, outputs S6 and S8 are connected at the same time as a second pair to inputs of multiplexer 24, and so on. Multiplexer 24 has a single output which is connected to the input of analog to digital converter 28. Analog to digital converter 28 has a single output which is connected to supply a byte at a time to the input of demultiplexer 32. Demultiplexer 32 has two pairs of outputs, the members of one of which are connected to supply respective bytes to the inputs of memories LIF01 and LIF02. The members of the other pair of outputs of demultiplexer 32 are connected to supply respective bytes to the inputs of memories LIF03 and LIF04. Memories LIF01 and LIF02 have outputs which are connected, as a first pair, to supply bytes to respective inputs of multiplexer 36. Memories LIF03 and LIF04 have outputs which are connected, as a second pair, to supply bytes to respective inputs of multiplexer 36. Finally, multiplexer 34 and multiplexer 36 have one output each and both are connected to inputs of multiplexer 38. Multiplexer 38, in turn, has a single output which is connected to supply sequential bytes to the input of demultiplexer 40. Demultiplexer 40 has three outputs G, R, and B (each carrying a respective one of the primary colors green, red, and blue) for providing the final output of system 20.

As has already been explained, odd numbered scanner outputs S1, S3, S5, S7, S9, and S11 yield pixel information in the same order that the pixels appear in the image line being scanned. Even numbered scanner outputs S2, S4, S6, S8, S10, and S12 yield pixel information in the opposite order. Both odd numbered and even numbered scanner outputs are read out in sequential pairs to their respective multiplexers, as shown below in Table 1.

TABLE 1

| t1 | t2 | t3 | t4 ... |
|----|----|----|--------|
| S1 | S5 | S9 | S1 ... |
| S3 | S7 | S11 | S3 ... |
| S2 | S6 | S10 | S2 ... |
| S4 | S8 | S12 | S4 ... |

Thus, during a first time slot t1, outputs S1 and S3 are read out simultaneously to multiplexer 22 while outputs S2 and S4 are being read out simultaneously to multiplexer 24. Next, during a second time slot t2, outputs S5 and S7 are read out simultaneously to multiplexer 22 while outputs S6 and S8 are being read out simultaneously to multiplexer 24. Finally, during a third time slot t3, outputs S9 and S11 are read out simultaneously to multiplexer 22 while outputs S10 and S12 are being read out simultaneously out to multiplexer 24. The cycle then repeats itself for the next line of the image being scanned. Because, from either half of scanner 16, only 2 out of 6 sensors are being read out at a time, the horizontal clock frequency (pixel rate) for each sensor need be only 6 megahertz (N equal to 6 and n equal to 2 in equation (1) ).

From multiplexer 22, odd numbered scanner outputs are fed, in numerical order, to analog to digital converter 26. The sampling frequency of converter 26 is n times or twice (n is equal to 2 in the illustrated example) the horizontal clock frequency of the sensors (i.e., twice the pixel rate). At the same time, even numbered scanner outputs are fed from multiplexer 24, in numerical order, to analog to digital converter 28. The sampling frequency of converter 28 is also twice the horizontal clock frequency of the sensors. Demultiplexer 30 separates the odd numbered scanner outputs and feeds them at the horizontal clock frequency (i.e., the pixel rate) in bytes to first in first out digital memories FIF01 through FIF04. At the same time, demultiplexer 32 separates the even numbered scanner outputs and feeds them at the horizontal clock frequency in bytes to last in first out digital memories LIF01 through LIF04.

The relative timing of the inputs to digital memories FIF01 through FIF04 and LIF01 through LIF04 is illustrated below in Table 2. In Table 2, the rows contain the suffix numerals of respective FIFO and LIFO memories and the columns designate the individual FIFO and LIFO memories being written into simultaneously during the indicated time slots.

TABLE 2

|  | T1 | T2 | T3 ... |
|---|----|----|--------|
| FIFO | 1 | 3 | 1 ... |
| FIFO | 2 | 4 | 2 ... |
| LIFO | 1 | 3 | 1 ... |
| LIFO | 2 | 4 | 2 ... |

As shown in Table 2, from demultiplexer 30 during a first time slot T1, the converted outputs from S1 and S3 are written simultaneously as bytes into memories FIF01 and FIF02 respectively. During the same time slot T1, the converted outputs from S2 and S4 are written simultaneously from demultiplexer 32 as bytes into memories LIF01 and LIF02 respectively. Next, during a second time slot T2, the converted outputs from S5 and S7 are written simultaneously from demultiplexer 30 as bytes into memories FIF03 and FIF04 respectively. During the same time slot T2, the converted outputs from S6 and S8 are written simultaneously from demultiplexer 32 as bytes into memories LIF03 and LIF04 respectively. Next, during a third time slot T3, the converted outputs from S9 and S11 are written simultaneously from demultiplexer 30 as bytes into memories FIF01 and FIF02 respectively, while the converted outputs from S10 and S12 are written simultaneously from demultiplexer 32 as bytes into memories LIF01 and LIF02 respectively. The process continues for the next line of the image being read, with the converted outputs from S1 and S3 being written simultaneously from demultiplexer 30 as bytes into memories FIF03 and FIF04 respectively, while the converted outputs from S2 and S4 are written simultaneously from demultiplexer 32 as bytes into memories LIF03 and LIF04 respectively.

As previously explained, because only two sensors are clocked out at a time through multiplexer 22 or multiplexer 24, the sensors are operated at a speed of only 6 megahertz instead of the 24 megahertz speed that would have been required had they been clocked out in sequence. At this lower speed, no sensor encounters CTI problems. Samples are digitized by analog to digital converters 26 and 28 at a rate n times (twice, in this example) the horizontal clock frequency.

Digital memories FIF01, LIF01, FIF02, and LIF02 are emptied at a 24 megahertz rate (the pixel rate times 4, the number of memories serving each half of scanner 16) in the order stated.

The relative timing of the emptying of digital memories FIF01 through FIF04 and LIFO1 through LIF04 is illustrated below in Table 3, where time slots T1, T2, T3, and so on are the same as the time slots in Table 2 bearing the same designations and individual memory suffix numerals are staggered in each column to indicate the sequential order within the time slot in which the memories are emptied. In Table 3, the rows contain the suffix numerals of respective FIFO and LIFO memories and the columns designate the FIFO and LIFO memories being sequentially emptied during the indicated time slots.

TABLE 3

| | T1 | T2 | T3 ... |
|---|---|---|---|
| FIFO | 3 | 1 | 3 ... |
| LIFO | 3 | 1 | 3 ... |
| FIFO | 4 | 2 | 4 ... |
| LIFO | 4 | 2 | 4 ... |

During time slot T1, memories FIF03 and FIF04 are emptied through multiplexer 34 and memories LIF03 and LIF04 are emptied through multiplexer 36. Multiplexers 34 and 36 thus perform respective selection functions. The emptying is accomplished in sequence, as shown by the staggered listing of the various memory suffix numerals in Table 3. Thus, memory FIF03 is emptied during the first quarter of T1, memory LIF03 is emptied during the second quarter of T1, memory FIF04 is emptied during the third quarter of T1, and memory LIF04 is emptied during the last quarter of T1.

Next, during time slot T2, digital memories FIF01, LIF01, FIF02, and LIF02 are emptied at a 24 megahertz rate in the order stated, with each operation occupying approximately a quarter of the time slot. Memories FIF03 and FIF04 are emptied through multiplexer 34 and memories LIF03 and LIF04 are emptied through multiplexer 36. As shown in Tables 2 and 3, the time sequence is such that memories FIF01 and FIF02 are being filled simultaneously while memories FIF03 and FIF04 are being emptied in sequence. Similarly, memories LIF01 and LIF02 are being filled simultaneously while memories LIF03 and LIF04 are being emptied in sequence.

The outputs from multiplexers 34 and 36 are combined in multiplexer 38 to place all sensor outputs in the order required for accurate reproduction of the line of the image being scanned. Demultiplexer 40 is optional in that it may be employed to separate primary colors if copying is done in color rather than monochrome.

System 20 is advantageous not only in that it permits all sensors of scanner 16 to be read out at the relatively low horizontal clock frequency of 6 megahertz but also in that it requires only a minimum number of expensive digital components. In system 20, those digital components are analog to digital converter 26 and memories FIF01 through FIF04 for the odd numbered sensor outputs and analog to digital converter 28 and memories LIF01 through LIF04 for the even numbered sensor outputs.

It should be further noted that, in system 20, it is not necessary that the functions of demultiplexers 30, 32, and 40 and multiplexers 34, 36, and 38 be accomplished separately from the semiconductor chips forming digital memories FIF01 through FIF04 and LIF01 through LIF04. As is known in the art, the functions of demultiplexer 30 may, if desired, be achieved through input tristate enabling logic on digital memories FIF01 through FIF04. Similarly, the functions of demultiplexer 32 may, if desired, be achieved through input tristate enabling logic on digital memories LIFO1 through LIF04. The functions of multiplexers 34, 36, and 38 and that of demultiplexer 40 may, if desired, be accomplished through output enabling tristate logic on digital memories FIF01 through FIF04 and LIFO1 through LIF04.

In its broader aspects, the present invention is embodied twice in system 20, once with respect to the components associated with the odd numbered sensor outputs and again with respect to the components associated with the even numbered sensor outputs. In a system having only single ended sensors, the invention applies in the same manner that the broader aspects apply to the portion of system 20 associated with the odd numbered sensor outputs. In other words, a system based upon single ended sensors would include, in addition to the scanner, components equivalent to multiplexer 22, analog to digital converter 26, demultiplexer 30, digital memories FIF01 through FIF04, and multiplexer 34. In some of its more specific aspects, of course, the invention applies directly to double ended sensor system 20 as illustrated in FIG. 4.

If reading out sensor outputs two at a time should provide a sensor pixel rate which, for any reason, still presents CTI problems, they may be read out three at a time at the cost of only a small increase in the number of digital memories required. The general expression giving the total number M of memory chips needed is $$M = 2n \times o \qquad (4)$$

where n is the number of sensors clocked out at a time and o is the number of outputs per sensor, both as have been defined previously.

It is to be understood that the embodiment of the invention which has been described is illustrative. Numerous other arrangements and modifications may be readily devised by those skilled in the art without departing from the spirit and scope of the invention.

What is claimed is:

1. A method of reading the contents from a plurality of N linear image sensors comprising the steps of:
   selecting and reading outputs in parallel from successive groups of n sensors at a time, where n is an integer greater than one;
   sampling and holding individual outputs from each of said groups in sequence;
   digitizing the samples of each of said groups in sequence;
   writing the digitized samples of successive ones of said groups into alternate ones of two sets of n digital memories; and
   reading the contents out of each set of digital memories while the next group of digitized samples is being written into the other set of digital memories.

2. The method of reading the contents from a plurality of N linear image sensors comprising the steps of:
   selecting and reading outputs in parallel from groups of n sensors at a time, where n is an integer greater than one divisible into N by an integer greater than one;
   sampling and holding individual outputs from each of said groups in sequence;
   digitizing the samples of each of said groups in sequence;
   writing the digitized samples of successive ones of said groups into alternate ones of two sets of n digital memories; and
   reading the contents out of each set of digital memories while the next group of digitized samples is being written into the other set of digital memories.

3. The method of claim 2 for reading the contents from a plurality of N linear image sensors in which the samples of each of said groups are digitized by a common analog to digital converter.

4. The method of claim 2 for reading the contents from a plurality of N linear image sensors in which pixels are read from sensor outputs at N/n times the ratio of the number of pixels per sensor output to total line time.

5. The method of claim 4 for reading the contents from a plurality of N linear image sensors in which the rate at which individual samples are digitized is equal to n times the rate at which pixels are read from sensor outputs.

6. The method of claim 5 for reading the contents from a plurality of N linear image sensors in which the rate of writing digitized samples into said memories is equal to the rate at which pixels are read from sensor outputs.

7. The method of claim 6 for reading the contents from a plurality of N linear image sensors in which the rate of reading the contents out of said memories is equal to the rate at which pixels are read from sensor outputs times the number of memories.

8. The method of claim 7 for reading the contents from a plurality of N linear image sensors in which N is an even, number and n is equal to 2.

9. A method of reading the contents from a plurality of N linear image sensors, each of said sensors having a forward readout and a reverse readout, said method comprising the steps of:
   selecting and reading outputs in parallel from forward readouts in parallel from successive groups of n sensors at a time, where n is an integer greater than one;
   sampling and holding individual outputs from each of said forward readout groups in sequence;
   digitizing the samples from each of said forward readout groups in sequence;
   selecting and reading outputs in parallel from forward readouts in parallel from successive groups of n sensors at a time;
   sampling and holding individual outputs from each of said reverse readout groups in sequence;
   digitizing the samples from each of said reverse readout groups in sequence;
   writing the digitized samples of successive ones of said forward readout groups into alternate ones of two sets of n first in first out digital memories;
   writing the digitized samples of successive ones of said reverse readout groups into alternate ones of two sets of n last in first out digital memories; and
   reading out the contents of each set of first in first out digital memories and the contents of each set of last in first out digital memories while the next groups of digitized samples are being written into the other sets of first in first out and last in first out digital memories.

10. A method of reading the contents from a plurality of N linear image sensors, each of said sensors having a forward readout and a reverse readout, said method comprising the steps of:
    selecting and reading outputs in parallel from forward readouts in parallel from successive groups of n sensors at a time, where n is an integer greater than one divisible into N by an integer greater than one;
    sampling and holding individual outputs from each of said forward readout groups in sequence;
    digitizing the samples from each of said forward readout groups in sequence;
    selecting and reading outputs in parallel from forward readouts in parallel from successive groups of n sensors at a time;
    sampling and holding individual outputs from each of said reverse readout groups in sequence;
    digitizing the samples from each of said reverse readout groups in sequence;
    writing the digitized samples of successive ones of said forward readout groups into alternate ones of two sets of n first in first out digital memories;
    writing the digitized samples of successive ones of said reverse readout groups into alternate ones of two sets of n last in first out digital memories; and
    reading out the contents of each set of first in first out digital memories and the contents of each set of last in first out digital memories while the next groups of digitized samples are being written into the other sets of first in first out and last in first out digital memories.

11. The method of claim 10 for reading the contents from a plurality of N linear image sensors in which the samples of each of said forward readout groups are digitized by a first common analog to digital converter and the samples of each of said reverse readout groups are digitized by a second common analog to digital converter.

12. The method of claim 10 for reading the contents from a plurality of N linear image sensors in which pixels are read from sensor outputs at N/n times the ratio of the number of pixels per sensor output to total line time.

13. The method of claim 12 for reading the contents from a plurality of N linear image sensors in which the rate at which individual samples are digitized is equal to n times the rate at which pixels are read from sensor outputs.

14. The method of claim 13 for reading the contents from a plurality of N linear image sensors in which the rate of writing digitized samples into said memories is equal to the rate at which pixels are read from sensor outputs.

15. The method of claim 14 for reading the contents from a plurality of N linear image sensors in which the rate of reading the contents out of said memories is equal to the rate at which pixels are read from sensor outputs times the number of memories.

16. The method of claim 15 for reading the contents from a plurality of N linear image sensors in which N is an even number and n is equal to 2.

17. A system for reading the contents from a plurality of N linear image sensors comprising:
means for selecting and reading outputs in parallel from successive groups of n sensors at a time, where n is an integer greater than one;
means for sampling and holding individual outputs from each of said groups in sequence;
means for digitizing the samples of each of said groups in sequence;
two sets of n digital memories;
means for writing the digitized samples of successive ones of said groups into alternate ones of said sets of digital memories; and
means for reading the contents out of each set of digital memories while the next group of digitized samples is being written into the other set of digital memories.

18. A system for reading the contents from a plurality of N linear image sensors comprising:
means for selecting and reading outputs in parallel from groups of n sensors at a time, where n is an integer greater than one divisible into N by an integer greater than one;
means for sampling and holding individual outputs from each of said groups in sequence;
means for digitizing the samples of each of said groups in sequence;
two sets of n digital memories;
means for writing the digitized samples of successive ones of said groups into alternate ones of said sets of digital memories; and
means for reading the contents out of each set of digital memories while the next group of digitized samples is being written into the other set of digital memories.

19. The system of claim 18 for reading the contents from a plurality of N linear image sensors in which the samples of each of said groups are digitized by a common analog to digital converter.

20. The system of claim 18 for reading the contents from a plurality of N linear image sensors in which pixels are read from sensor outputs at N/n times the ratio of the number of pixels per sensor output to total line time.

21. The system of claim 20 for reading the contents from a plurality of N linear image sensors in which the rate at which individual samples are digitized is equal to n times the rate at which pixels are read from sensor outputs.

22. The system of claim 21 for reading the contents from a plurality of N linear image sensors in which the rate of writing digitized samples into said memories is equal to the rate at which pixels are read from sensor outputs.

23. The system of claim 22 for reading the contents from a plurality of N linear image sensors in which the rate of reading the contents out of said memories is equal to the rate at which pixels are read from sensor outputs times the number of memories.

24. The system of claim 23 for reading the contents from a plurality of N linear image sensors in which N is an even number and n is equal to 2.

25. A system for reading the contents from a plurality of N linear image sensors, each of said sensors having a forward readout and a reverse readout, said system comprising:
means for selecting and reading outputs in parallel from forward readouts in parallel from successive groups of n sensors at a time, where n is an integer greater than one;
means for sampling and holding individual outputs from each of said forward readout groups in sequence;
means for digitizing the samples from each of said forward readout groups in sequence;
means for selecting and reading outputs in parallel from forward readouts in parallel from successive groups of n sensors at a time;
means for sampling and holding individual outputs from each of said reverse readout groups in sequence;
means for digitizing the samples from each of said reverse readout groups in sequence;
two sets of n first in first out digital memories;
means for writing the digitized samples of successive ones of said forward readout groups into alternate ones of said sets of first in first out digital memories;
two sets of n last in first out digital memories;
means for writing the digitized samples of successive ones of said reverse readout groups into alternate ones of said sets of last in first out digital memories; and
means for reading out the contents of each set of first in first out digital memories and the contents of each set of last in first out digital memories while the next groups of digitized samples are being written into the other sets of first in first out and last in first out digital memories.

26. A system for reading the contents from a plurality of N linear image sensors, each of said sensors having a forward readout and a reverse readout, said system comprising:
means for selecting and reading outputs in parallel from forward readouts in parallel from successive groups of n sensors at a time, where n is an integer greater than one divisible into N by an integer greater than one;
means for sampling and holding individual outputs from each of said forward readout groups in sequence;
means for digitizing the samples from each of said forward readout groups in sequence;
means for selecting and reading outputs in parallel from forward readouts in parallel from successive groups of n sensors at a time;

means for sampling and holding individual outputs from each of said reverse readout groups in sequence;

means for digitizing the samples from each of said reverse readout groups in sequence;

two sets of n first in first out digital memories;

means for writing the digitized samples of successive ones of said forward readout groups into alternate ones of said sets of first in first out digital memories;

two sets of n last in first out digital memories;

means for writing the digitized samples of successive ones of said reverse readout groups into alternate ones of said sets of last in first out digital memories; and means for reading out the contents of each set of first in first out digital memories and the contents of each set of last in first out digital memories while the next groups of digitized samples are being written into the other sets of first in first out and last in first out digital memories.

27. The system of claim 26 for reading the contents from a plurality of N linear image sensors in which the samples of each of said forward readout groups are digitized by a first common analog to digital converter and the samples of each of said reverse readout groups are digitized by a second common analog to digital converter.

28. The system of claim 26 for reading the contents from a plurality of N linear image sensors in which pixels are read from sensor outputs at N/n times the ratio of the number of pixels per sensor output to total line time.

29. The system of claim 28 for reading the contents from a plurality of N linear image sensors in which the rate at which individual samples are digitized is equal to n times the rate at which pixels are read from sensor outputs.

30. The system of claim 29 for reading the contents from a plurality of N linear image sensors in which the rate of writing digitized samples into said memories is equal to the rate at which pixels are read from sensor outputs.

31. The system of claim 30 for reading the contents from a plurality of N linear image sensors in which the rate of reading the contents out of said memories is equal to the rate at which pixels are read from sensor outputs times the number of memories.

32. The system of claim 31 for reading the contents from a plurality of N linear image sensors in which N is an even number and n is equal to 2.

* * * * *